United States Patent [19]

Trauffer et al.

[11] Patent Number: 5,698,171
[45] Date of Patent: Dec. 16, 1997

[54] REGENERATIVE METHOD FOR REMOVING SULFIDES FROM GAS STREAMS

[75] Inventors: Edward A. Trauffer, Rydal; Muge Caglar, Ardmore, both of Pa.

[73] Assignee: Quaker Chemical Corporation, Conshohocken, Pa.

[21] Appl. No.: 587,837

[22] Filed: Jan. 10, 1996

[51] Int. Cl.⁶ ............................................ B01D 53/52
[52] U.S. Cl. ..................... 423/220; 423/224; 423/226; 423/573.1; 423/576.4; 423/576.7
[58] Field of Search ............................. 423/220, 224, 423/226, 242.1, 573.1, 576.4, 576.7

[56] References Cited

U.S. PATENT DOCUMENTS

| | | | |
|---|---|---|---|
| 2,776,870 | 1/1957 | Fischer | 23/2 |
| 3,622,273 | 11/1971 | Roberts et al. | 23/225 R |
| 4,076,621 | 2/1978 | Hardison | 210/60 |
| 4,112,051 | 9/1978 | Satori et al. | 423/223 |
| 4,414,194 | 11/1983 | Blytas | 423/573 G |
| 4,436,714 | 3/1984 | Olson | 423/573 G |
| 4,455,287 | 6/1984 | Primack et al. | 423/573 R |
| 4,541,998 | 9/1985 | Weber | 423/226 |
| 4,624,838 | 11/1986 | Pan et al. | 423/226 |
| 4,647,397 | 3/1987 | Starkston et al. | 252/189 |
| 4,775,519 | 10/1988 | Yit Nieh | 423/226 |
| 4,978,512 | 12/1990 | Dillon | 423/226 |
| 5,128,049 | 7/1992 | Gatlin | 210/752 |
| 5,160,714 | 11/1992 | Hardison | 423/220 |
| 5,273,734 | 12/1993 | Sawyer et al. | 423/573.1 |
| 5,347,003 | 9/1994 | Trauffer et al. | 544/8 |

FOREIGN PATENT DOCUMENTS

| | | |
|---|---|---|
| 4290547 | 10/1992 | Japan . |
| 2103645 | 2/1983 | United Kingdom . |

OTHER PUBLICATIONS

"Gas Purification" by Kohl et al.; 4th. ed., Gulf Publishing Co. Houston TX USA, (1985, No Month Given), pp. 486–488.

*Primary Examiner*—Gary P. Straub
*Assistant Examiner*—Timothy C. Vanoy
*Attorney, Agent, or Firm*—Ratner & Prestia

[57] ABSTRACT streams. The method includes contacting the sulfide-containing gas stream with an aqueous scavenging mixture which includes a scavenging compound, that is a product of reaction between an aldehyde and a nitrogen compound, an inorganic ion and an oxidation catalyst: regenerating at least a portion of the scavenging compound with an oxygen-containing gas and returning at least a portion of the aqueous scavenging mixture to the contacting zone.

20 Claims, No Drawings

REGENERATIVE METHOD FOR REMOVING SULFIDES FROM GAS STREAMS

FIELD OF THE INVENTION

The present inventions relates to a method for removing hydrogen sulfide and mercaptans from gas streams. The method is particularly useful because it allows for economic regeneration of the spent solution.

BACKGROUND OF THE INVENTION

Hydrogen sulfide is a toxic, corrosive and malodorous compound. It may be found in a variety of liquid and gaseous media such as natural gas, petroleum, refinery gas streams, carbon dioxide, hydrogen, coal gas streams, gas streams from viscose rayon production, tars and asphalt, shale gas, coke oven gases, ammonia synthesis gas, rubber vulcanization streams, gases from sulfurization plants, turpentine production, pulp and paper mill effluent, sewage, brine drilling mud, land fills, phosphoric acid production gas streams, and other industrial gas streams and effluents. They are also found in the tail gases and liquids of some hydrogen sulfide scrubbing processes such as Claus plants and amine scrubbing units.

Hydrogen sulfide is an undesirable contaminant which is highly toxic, corrosive and has an objectionable odor. The release of hydrogen sulfide into the environment is strictly controlled by the Environmental Protection Agency, the Department of Environmental Resources, as well as by other regulatory agencies throughout the world. Hydrogen sulfide not only has an offensive odor, but it has also been linked to the formation of acid rain.

Methods for removing hydrogen sulfide may be generally classified as regenerative and non-regenerative. Regenerative processes are generally more desirable because waste products are recycled. By regenerating sulfur scavenging compounds and thereby recycling the waste products, the cost, both economically and environmentally, of replenishing spent chemicals in the process and disposing of the waste products is lessened or eliminated. It is even more desirable to recover the sulfur scavenged during the hydrogen sulfide scavenging reaction in a useful form.

Various amines and alkanolamines, which may be regenerated, have been used to remove acids, such as hydrogen sulfide from gas streams. U.S. Pat. No. 2,776,870 discloses that aqueous amines and alkanolamines are useful for removing acids from a gaseous mixture. Hydrogen sulfide may be selectively removed from gas streams containing carbon dioxide by use of triethanolamine or methyldiethanolamine.

British Published Patent Specification No. 2103645 discloses that hydrogen sulfide and carbon dioxide may be removed from a gas mixture by contacting the mixture with a solvent comprising a tertiary amine and a physical absorbent. Suitable physical adsorbents include N-methylpyrrolidone and sulfolane.

U.S. Pat. No. 4,112,051 discloses a process for removing acidic gases from a gaseous mixture with an amine-solvent liquid absorbent comprising (1) an amine comprised of at least about 50 mole percent of a sterically hindered amine; and (2) a solvent for the amine mixture which is also a physical absorbent for the acid gases. Suitable sterically hindered amines include various piperidine compounds. Suitable solvents include sulfones and pyrrolidone and piperidone compounds, to name a few.

U.S. Pat. No. 4,978,512 discloses methods for reducing the levels of hydrogen sulfide and organic sulfides in a hydrocarbon stream by contacting the stream with a composition comprising a reaction products of a lower alkanolamine with a lower aldehyde. Suitable reaction products include mixtures of triazine and bisoxazolidine compounds.

U.S. Pat. No. 4,647,397 discloses a process and composition for removing hydrogen sulfide and similar sulfides from a gas stream. The gas stream is contacted with a substituted aromatic nitrile having an electron-attracting substitutent on the aromatic ring at least as strong as halogen and an organic tertiary amine in an inert organic solvent, such as N-methyl-2-pyrrolidone. The spent contacting solution may be regenerated by heating the solution above the decomposition temperature of the reaction products to separate the sulfides from the liquid phase absorbent solution.

U.S. Pat. No. 4,775,519 discloses a continuous process for removing acid gas components from a gas stream by counter-currently contacting the stream with an aqueous solution of a mixture of N-methyldiethanolamine (MDEA) with imidazole or a methyl substituted imidazole. The gas is de-absorbed from the MDEA and the imidazole by reducing the pressure and causing the gas to flash.

U.S. Pat. No. 4,624,838 discloses a process for removing acid gases from a gaseous stream by contacting the stream with an aqueous scrubbing solution containing a hetero nitrogen compound comprising either a five- or six- membered ring having a pKa no greater than about 8. Preferred hetero nitrogen compounds include imidazole and piperazine compounds.

U.S. Pat. No. 5,128,049 discloses a method for reducing the hydrogen sulfide content of hydrocarbon-containing fluids and aqueous solutions by injections of a dilute solution of a scavenging agent. Suitable scavenging agents include hexahydro-1,3,5-tris(2-hydroxyethyl)-s-triazine and various other compounds.

U.S. Pat. No. 5,347,003 describes a regenerative method where an N-C-N compound is regenerated from a product of a sulfur scavenging reaction, in which said N-C-N compound removes a sulfur atom from a sulfur compound to form the original N-C-N compound.

U.S. Pat. No. 3,622,273 discloses a regenerative method for the removal of hydrogen sulfide from a gaseous stream wherein the gaseous stream is contacted with a solution containing, by weight, from 0.005 to 20 percent of a ferric ion complex, from 25.0 to 99.945 percent of water and from 0.05 to 10.0 percent of a buffering agent selected from the group consisting of alkali metal carbonate.

There are numerous patents dealing with the removal of hydrogen sulfide from liquid or gas streams with various metal chelates through redox reactions with a higher oxidation state of the metal followed by oxidative regeneration through the use of air. As a sampling: U.S. Pat. No. 4,076,621 deals with iron chelates for the removal of hydrogen sulfide from water; U.S. Pat. No. 4,414,194 deals with iron chelates with alcohol as a crystal modifier; U.S. Pat. No. 4,436,714 deals with the use of metal chelates followed by electrolytic regeneration. All of the patents related to the use of metal chelates have the use of the metal ion to directly oxidize hydrogen sulfide to a higher oxidation state in common. A draw back of this technology is the long contact time required in order to achieve efficient removal of hydrogen sulfide from the gas streams and the cost of the reactants.

U.S. Pat. No. 4,455,287 describes a method of oxidizing hydrogen sulfide in gases to elemental sulfur by a continuous polyvalent metal catalytic liquid phase oxidation with catalysts such as iron chelate solutions in which the solution is stabilized by incorporating a general purpose biocide at a level below the kill concentration of the biocide. Typical biocide concentrations where in the low parts per million range by weight of solution. This is different from the present invention in that the aminal compounds are not general purpose biocides, although at least one has been used as a fungicide. None of the biocides described are known to reduce the levels of hydrogen sulfide. Additionally, the levels of biocide used where far too low to achieve a measurable reduction of hydrogen sulfide, even if they where reactive.

There is a long-felt need in the art for improved, economic methods for regenerating sulfur scavenging compounds. Regenerating such compounds is not only environmentally desirable, but is also cost efficient and may reduce or eliminate the need for expensive processing equipment. In addition, since the scavenging compounds are regenerated, the need for purchasing replacement scavenging compound is greatly reduced.

An even greater benefit may be realized when the scavenged compounds are converted to a commercially useful form. The regeneration of sulfur compounds in such form provide a further financial incentive for the scavenging of such compounds and even further reduces the burden on waste disposal systems.

Definitions

As used herein the term "sulfides" is defined to mean compounds selected from the group including hydrogen sulfide and mercaptans.

SUMMARY OF THE INVENTION

The present invention provides a method and composition for the removal of sulfides from gaseous streams. The method includes contacting the sulfide-containing gas stream with an aqueous scavenging mixture which includes a scavenging compound, an inorganic ion and an oxidation catalyst; regenerating at least a portion of the scavenging compound with a gas such as air, oxygen enriched air, oxygen, ozone enriched air and ozone; and returning at least a portion of the aqueous scavenging mixture to the contacting zone.

The composition includes a scavenging compound, an inorganic ion and an oxidation catalyst. The scavenging compound is a reaction product between an aldehyde and an nitrogen compound. Typical aldehydes include formaldehyde, paraformaldehyde, glyoxal, acetaldehyde, butyraldehyde, benzaldehyde, N-(2-hydroxyethyl)dioxazine and oleylaldehyde, while typical amines include methylamine, ethylamine, propylamine, isopropyl amine, oleylamine, ethylene diamine, diethylene tdamine, dimethylamine, diethylamine, monoethanolamine, diethanolamine, morpholine piperazine, thiomonoethanolamine and chlorooleylamine. The inorganic ion is selected from the group of an alkaline ion, an alkaline earth metal ion, sodium and potassium. The oxidation catalyst is a polyvalent ion.

DESCRIPTION OF THE PREFERRED EMBODIMENTS

The present method describes a means for the removal of hydrogen sulfide from a gaseous stream with subsequent regeneration of the reaction mixture. E. A. Trauffer and R. D. Evans in U.S. Pat. No. 5,347,003, incorporated herein by reference, describe a method for regenerating a sulfur scavenging compound from a product of a sulfur scavenging reaction wherein the sulfur scavenging compound is represented by a nitrogen compound of the formula (I):

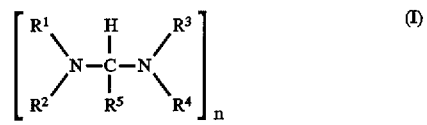

Each of $R^1$, $R^2$, $R^3$, $R^4$, and $R^5$ is independently selected from the group consisting of: (i) hydrogen; (ii) a substituted of unsubstituted, saturated of unsaturated, linear, branched or cyclic hydrocarbon chain of 1 to 20 carbons; (iii) a substituted or unsubstituted, saturated or unsaturated, linear, branched or cyclic hydrocarbon chain of 1 to 20 carbons comprising at least one heteroatom selected from the group consisting of nitrogen, oxygen, sulfur and halogen; (iv) a substituted or unsubstituted polymeric chain; and (v) a direct bond to any other of $R^1$, $R^2$, $R^3$, $R^4$, and $R^5$.

Examples of scavenging compounds which are useful as the initial scavenging step include various triazines, such as 1,3,5-tris(2-hydroxyethyl)hexahydro-s-triazine, and trimethyl triazine, bisoxazolidines, such as N,N'-methylene bisoxazolidine, piperidines, piperazines, amines, such as methyldiethanolamine, bis(dibutylamino)methane and bis (di-2-hydroxyethylamino)methane, bis(morpholino) methane, 1,3,6,8-tricyclotetraaza[4,4,1,1$^{3.8}$a]-dodecane, and primary, secondary and tertiary amines.

At least part of the scavenging compound is first reacted with hydrogen sulfide from the hydrogen sulfide containing stream forming a hetero compound. The hetero compound is then reacted with an alkaline compound to regenerate the spent scavenging compound.

While efficient, the regenerative method described requires the addition of an alkaline material in a quantity that is proportional to the amount of hydrogen sulfide that has been reacted. The present method allows for the in situ formation and regeneration of the alkaline material in an economic manner. Additionally, elemental sulfur may be formed as a by-product of the reaction, reducing the total amount of by-product. This is achieved by preparing a composition containing the scavenging compound, a catalytic quantity of a soluble inorganic base or one of its salts, a redox catalyst, and diluent water. The composition may also contain a variety of other components that may impart additional desirable properties, including but not limited to, defoamers, crystal modifiers, antifreeze compounds and scents.

In the present method, the scavenging compound is a reaction product between (a) an aldehyde of formula (II):

Where R is selected from the group consisting of: (i) hydrogen; (ii) a substituted or unsubstituted, saturated or unsaturated, linear, branched or cyclic hydrocarbon chain of 1 to 50 carbons; (iii) a substituted or unsubstituted, saturated or unsaturated, linear, branched or cyclic hydrocarbon chain of 1 to 50 carbons comprising at least one heteroatom selected from the group consisting of nitrogen, oxygen, sulfur and halogen; (iv) a substituted or unsubstituted polymeric chain; (v) a substituted or unsubstituted dimer (vi) a mono or polyaldehyde. The aldehyde may be utilized in anhydrous or hydrated forms of the above. Examples of aldehydes suitable for the present invention include, but are not limited to: formaldehyde, paraformaldehyde, glyoxal, acetaldehyde, butyraldehyde, benzaldehyde, N-(2-hydroxyethyl)dioxazine, oleylaldehyde and (b) an nitrogen compound of formula (III)

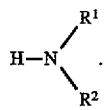

Wherein $R^1$ and $R^2$ are independently selected from the group consisting of: (i) hydrogen; (ii) a substituted of unsubstituted, saturated of unsaturated, linear, branched or cyclic hydrocarbon chain of 1 to 50 carbons; (iii) a substituted or unsubstituted, saturated or unsaturated, linear, branched or cyclic hydrocarbon chain of 1 to 50 carbons comprising at least one heteroatom selected from the group consisting of nitrogen, oxygen, sulfur and halogen; (iv) a substituted or unsubstituted polymeric chain; and (v) a direct bond to any other of $R^1$ and $R^2$. Examples of suitable nitrogen compounds for the present invention include, but are not limited to methylamine, ethylamine, propylamine, isopropyl amine, oleylamine, ethylene diamine, diethylene triamine, dimethylamine, diethylamine, monoethanolamine, diethanolamine, morpholine, piperazine, thiomonoethanolamine, chlorooleylamine.

The nitrogen compound and the aldehyde of the present invention may be reacted in any molar ratio with preferred ratio being from 1 mole aldehyde to 10 moles nitrogen compound to 10 moles aldehyde to 1 mole nitrogen compound, a more preferred ratio being from 1 mole aldehyde to 5 moles nitrogen compound to 5 moles aldehyde to 1 mole nitrogen compound, an even more preferred ratio being 1 mole aldehyde to 3 moles nitrogen compound to 3 moles aldehyde to 1 mole nitrogen compound and a most preferred ratio being 1 mole aldehyde to 1 mole nitrogen compound.

The scavenging compound formed from the reaction of the aldehyde and nitrogen compound are dependent upon the selected nitrogen compound, the selected aldehyde and the ratios of each selected, as is self evident to those of ordinary skill in the art. Similarly mixtures of the above aldehydes and nitrogen compounds may also be reacted in order to form singular or mixtures of various scavenging compounds as is also evident to one of ordinary skill in the art.

The reaction of the nitrogen compound and the aldehyde listed above will typically result in the formation of an aminal. Aminals typical of those formed in the described reaction are of the type as in formula I, IV, formula V, or mixtures thereof as is evident to one of ordinary skill in the art where formula I, IV and formula V are represented by:

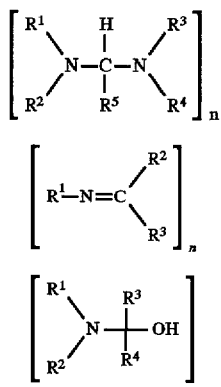

Where n is an integer from 1 to 1000 and each of $R^1, R^2, R^3, R^4$, and $R^5$ is independently selected from the group consisting of: (i) hydrogen; (ii) a substituted of unsubstituted, saturated of unsaturated, linear, branched or cyclic hydrocarbon chain of 1 to 20 carbons; (iii) a substituted or unsubstituted, saturated or unsaturated, linear, branched or cyclic hydrocarbon chain of 1 to 20 carbons comprising at least one heteroatom selected from the group consisting of nitrogen, oxygen, sulfur and halogen; (iv) a substituted or unsubstituted polymeric chain; and (v) a direct bond to any other of $R^1, R^2, R^3, R^4$, and $R^5$.

Examples of scavenging compounds which are useful as the initial scavenging step include various triazines, such as 1,3,5-tris(2-hydroxyethyl)hexahydro-s-triazine, and trimethyl triazine, bisoxazolidines, such as N,N'-methylene bisoxazolidine, piperidines, piperazines, amines, such as methyldiethanolamine, bis(dibutylamino)methane and bis (di-2-hydroxyethylamino)methane, bis(morpholino) methane, 1,3,6,8-tricyclotetraaza[4,4,1,1$^{3.8}$]-dodecane, primary, secondary and tertiary amines, non-generic aminals such as 2,7-dioxa-5,10 diazabicyclo[4.4.0]dodecane, methylaminomethanol, ethylmethyleneimine, isopropylmethyleneamine.

The inorganic base of the present invention is selected from any water soluble or dispersable inorganic base. A preferred base is selected from bases from group I and group II cations. A most preferred base is selected from those from sodium and potassium cations. The base may be added as either the hydroxide or as a water soluble salt. The overall regenerative reaction includes the in situ regeneration of the strong base of the selected cation. For this reason even water dissociated salts will perform as desired. Examples of such salts include but are not limited to, sodium carbonate, sodium chloride, sodium sulfide, potassium carbonate potassium chloride and potassium sulfide.

Suitable oxidation catalysts include, but are not limited to, aqueous solutions of polyvalent metal ions. More specifically the polyvalent metal ions may include: iron, copper, vanadium, manganese, platinum, tungsten, nickel, mercury, tin and lead with iron and vanadium being more preferred and iron being most preferred. Solutions of the metal ions are most easily applied as the corresponding chelate. Suitable chelants include but are not limited to: ethylene diamine tetraacetic acid (EDTA), N-hydroxyethyl ethylenediamine tetraacetic acid (HEDTA), NTA, and Sorbitol. The aminal compound may also act as the chelant or participate in stabilizing the metal ion in solution.

The overall reaction involves contacting the solution with a gas containing a sulfide selected from hydrogen sulfide and mercaptans in order to react at least some of the scavenging compound with the sulfide and forming at least some spent scavenging compound in the form of a sulfur containing compound. The inorganic base then in situ reacts with the sulfur containing compound to regenerate the scavenging compound and forming the sulfide of the inorganic base. The inorganic sulfide then in situ reacts with an oxidation source to regenerate the inorganic base in solution and form a higher oxidation state of sulfur, such as elemental sulfur. Additionally an oxidation catalyst may be added to facilitate the oxidation of the inorganic sulfide. The oxidation catalyst is utilized to oxidize the inorganic base. The reduced catalyst is then oxidized by a suitable oxidation source such as oxygen or ozone. It has been found that the oxidation catalyst may not be necessary when ozone is utilized as the oxidation source.

The reaction is believed to proceed as in the following specific, non limiting example:

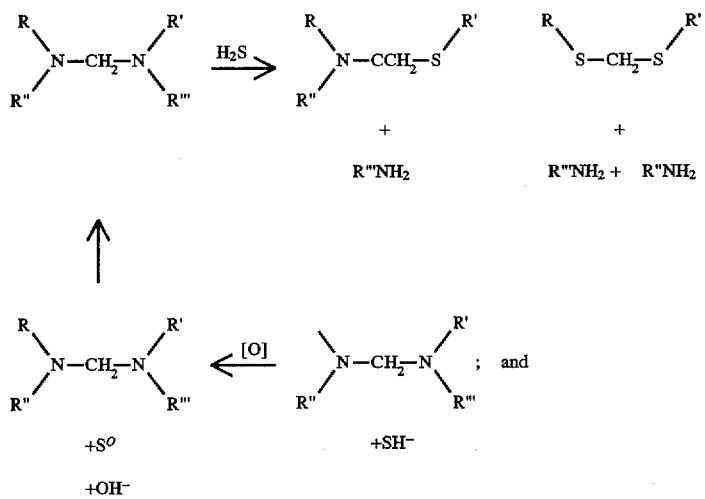

It is important to note that each of the components of the mixture may be added in either their initially reactive, or reacted form since all of the reactants in solution are regenerated in at least one step of the process. For example sodium hydroxide may be added as the inorganic base. It may also be introduced as sodium sulfide, sodium carbonate, or any other salt that is know to dissociate in water, allowing for its in situ formation under the reaction conditions. Many chelants are supplied as the inorganic salt. In these forms it also is a sufficient source of the inorganic ion. The metal catalyst may be added in either an oxidized or reduced form. Similarly, the scavenging compound may be added in it's spent or fresh form.

Upon regeneration, the identical amine compound that was used in the starting composition is not necessarily formed. The regenerated compound may be of a different chemical structure due to rearrangement or other chemical transformations. However, whatever the structure, the regenerated compound will react in the desired manner to scavenge hydrogen sulfide and mercaptans.

The present method provides for a superior regenerative sulfide scavenging system due to the rapid reaction of the scavenging compound with hydrogen sulfide. The rapid reaction time allows for the design of relatively small contact equipment for low capital cost. Additionally the process may be carried out in virtually any existing equipment that has been designed for the removal of hydrogen sulfide from gasses by metal chelates. Such processes include, but are not limited to: Stretford, Lo-Cat and Sulferox equipment. Existing non-regenerative scrubber equipment may also be utilized by adding a regeneration loop in which the at least partially spent aminal compound is drained from the scrubber, directed to the regeneration equipment, and then returned to either a storage tank or directly to the contact scrubber.

In a typical application fresh, or fully or partially regenerated scavenging compound is contacted with a hydrogen sulfide or mercaptan containing gas stream for a time sufficient to lower the levels of hydrogen sulfide or mercaptans to the desired amount. Some or all of the resultant at least partially spent scavenging compound is removed from the scrubber and transferred to an oxidation zone. The solution is contacted with an oxidizing gas such as air, oxygen, ozone, or mixtures thereof for a period of time to allow for the partial or complete regeneration of the scavenging compound. In the oxidation tank, the sulfur in the spent scavenging compound is converted through in situ reaction to sulfide ion and subsequently oxidized in-situ to elemental sulfur and other higher oxidation states of sulfur. The resultant slurry containing elemental sulfur and at least partially regenerated amine compound is optionally passed through a solids separation stage where at least a portion of the solid elemental sulfur is removed. Solid separation may be achieved by any means known in the art including, but not limited to, settling, gravity filtration, vacuum filtration, centrifugation, filter pressing, or combinations thereof. The solution is then passed to a storage tank or returned to the scrubber. The process may be carried out either continuously or in a batch operation. A certain amount of volume of the liquid is lost in the solid separation stage. Make-up product may be added at any point in the process to replace the lost volume. The preferred injection point of make-up material is prior to the scrubber. This will allow for the highest concentration of scavenging compound in the gas contacting stage. Equipment or other considerations may require addition of make-up at other points.

The solution may also be applied in an auto circulation type equipment in which scrubbing and oxidation are carried out in the same vessel as described in U.S. Pat. No. 5,160,714, incorporated herein by reference. Similar effects may be achieved where the sulfide containing gas stream contains a sufficient amount of oxygen to allow for scrubbing and oxidation in the same vessel. The oxygen may be already present, or may be combined with the sulfide containing gas stream through the introduction of air, or an alternate source of oxygen gas.

It is recognized that in a continuous process, there will always be at least some spent scavenging compound present at all points in the system if the equipment is optimized for capital cost and material cost. The presence of spent scavenging compound will have no deleterious effect on the reactions in the system. Under these conditions the solution will also contain the reduced form of the oxidation catalyst. The presence of the reduced form of the oxidation catalyst will not result in the reduction of hydrogen sulfide in the scrubber section of the apparatus since it is unreactive with hydrogen sulfide in this state. The ratios of scavenging compound to inorganic ion to oxidation catalyst may vary dependant on the physical parameters of the installed equipment. In general the quantity of oxidation catalyst should be minimized due to its relatively higher cost. Ratios to be utilized are best determined on a molar basis. The effective equivalent weight of the scavenging compound can most easily be determined by reacting it to completion with a measured quantity of hydrogen sulfide and then dividing the weight of the scavenging compound utilized by the moles of hydrogen sulfide consumed. Ideally the hydrogen sulfide source should be the gas stream to be treated. The equivalent weights of the inorganic ions and oxidation catalysts are well known in the art.

It is preferred that from 1 to 10000 molar equivalents of scavenging compound is utilized with from 1 to 10000 molar equivalents of inorganic ion and from 1 to 10000 equivalents of oxidation catalyst. In a more preferred method, from 1 to 10000 molar equivalents of scavenging compound is utilized with from 1 to 100 molar equivalents of inorganic ion and from 1 to 100 molar equivalents of oxidation catalyst. In a most preferred method from 1 to 10000 molar equivalents of scavenging compound is utilized with from 1 to 10 molar equivalents of inorganic ion and from 1 to 10 molar equivalents of oxidation catalyst.

Water is present in the composition of the present method as a diluent and to assist as an absorption medium to assist in the reaction with hydrogen sulfide. Water may be present in any quantity, with a preferred quantity being up to 99.5% by weight, a more preferred quantity being from 25% by weight to 99.5% by weight and a most preferred being from 50% by weight to 95% by weight.

The present method will now be illustrated in more detail by reference to the following, specific, non-limiting examples.

EXAMPLE 1

Ferric Chloride (FeCl$_3$) (1.34 grams), available commercially from Aldrich Chemical of Milwaukee Wis., and Sodium salt of N-hydroxyethyl ethylenediamine tetraacetic acid (Na$_3$HETDA) (3.08 grams), available commercially from Aldrich Chemical of Milwaukee Wis., where added to 60 ml of distilled water and mixed until dissolved, forming Fe$^{3+}$HEDTA. To this mixture was added 5 grams of a 43% solution of 1,3,5-tri(2-hydroxyethyl)hexahydro-s-triazine, available commercially from Quaker Chemical Corporation of Conshohocken Pa, 0.32 grams of a 50% by weight solution of sodium hydroxide, available commercially from Aldrich Chemical of Milwaukee Wis., and 100 grams of distilled water. The solution was then reacted with 99.5% hydrogen sulfide gas, available commercially from Aldrich Chemical of Milwaukee Wis., in a 500 ml bottle by bubbling the hydrogen sulfide into the solution at room temperature (approx 20 C.) at a flow rate of 9 ml/min. The bubbling was continued until the presence of hydrogen sulfide was detected in the gas exiting the bottle with a Sensidyn tube. Once the material was spent, the hydrogen sulfide bubbling tube was replaced with an air bubbling tube. Air was bubbled through the solution at a temperature of 70 C. for an average of 2.3 hours at a flow rate of 1500 ml/min. The solid precipitate was vacuum filtered with a 5 micron glass filter. The process was repeated with the same solution for 13 full cycles. At the end of 13 cycles, 10.8 grams of hydrogen sulfide had been reacted. Total solid recovery was 7.9. grams.

EXAMPLE 2

Ferric Chloride (FeCl$_3$) (1.34 grams), available commercially from Aldrich Chemical of Milwaukee Wis., and Sodium salt of N-hydroxyethyl ethylenediamine tetraacetic acid (Na$_3$HETDA) (3.08 grams), available commercially from Aldrich Chemical of Milwaukee Wis., where added to 60 ml of distilled water and mixed until dissolved, forming Fe$^{3+}$HEDTA. To this mixture was added 5 grams of a 43% solution of 1,3,5-tri(2-hydroxyethyl)hexahydro-s-triazine, available commercially from Quaker Chemical Corporation of Conshohocken Pa., 0.32 grams of a 50% by weight solution of sodium hydroxide, available commercially from Aldrich Chemical of Milwaukee Wis. and 100 grams of distilled water. The solution was then reacted with 99.5% hydrogen sulfide gas, available commercially from Aldrich Chemical of Milwaukee Wis. in a 500 ml bottle by bubbling the hydrogen sulfide into the solution at room temperature (approx 20 C.) at a flow rate of 10.4 ml/min. The bubbling was continued until the presence of hydrogen sulfide was detected in the gas exiting the bottle with a Sensidyn tube. Once the material was spent, the hydrogen sulfide bubbling tube was replaced with an ozone enriched air bubbling tube. The ozone enriched air was generated from air using a Coolant Manager ozone generator from Hyde Products Inc. The ozone concentration generated in the air by the Coolant Manager was 431 ppm. The ozone enriched air was bubbled through the solution at room temperature (approx 20 C.) at a flow rate of 38 ml/sec for an average of 1 hour. The solid precipitate was vacuum filtered with a 5 micron glass filter. The process was repeated with the same solution for 8 full cycles. At the end of 8 cycles, 9.1 grams of hydrogen sulfide had been reacted. Total solid recovery was 6.9 grams.

EXAMPLE 3

Ferric Chloride (FeCl$_3$) (1.34 grams), available commercially from Aldrich Chemical of Milwaukee Wis. and Sodium salt of N-hydroxyethyl ethylenediamine tetraacetic acid (Na$_3$HETDA) (3.08 grams), available commercially from Aldrich Chemical of Milwaukee Wis. where added to 60 ml of distilled water and mixed until dissolved, forming Fe$^{3+}$HEDTA. To this mixture was added 5 grams of a 43% solution of 1,3,5-tri(2-hydroxyethyl)hexahydro-s-triazine, available commercially from Quaker Chemical Corporation of Conshohocken Pa., 0.32 grams of a 50% by weight solution of sodium hydroxide, available commercially from Aldrich Chemical of Milwaukee Wis. 0.42 grams of sodium sulfite (available commercially from Aldrich Chemical of Milwaukee Wis.) and 100 grams of distilled water. The solution was then reacted with 99.5% hydrogen sulfide gas, available commercially from Aldrich Chemical of Milwaukee Wis. in a 500 ml bottle by bubbling the hydrogen sulfide into the solution at room temperature (approx 20 C.) at a flow rate of 4.7 ml/min. The bubbling was continued until the presence of hydrogen sulfide was detected in the gas exiting the bottle with a Sensidyn tube. Once the material was spent, the hydrogen sulfide bubbling tube was replaced with an ozone enriched air bubbling tube. The ozone enriched air was generated from air using a Coolant Manager ozone generator from Hyde Products Inc. The ozone concentration generated in the air by the Coolant Manager was 431 ppm The ozone enriched air was bubbled through the solution at room temperature (approx 20 C.) at a flow rate of 38 ml/sec for an average of 1 hour. The solid precipitate was vacuum filtered with a 5 micron glass filter. The process was repeated with the same solution for 5 full cycles. At the end of 5 cycles, 7.0 grams of hydrogen sulfide had been reacted. Total solid recovery was 4.8 grams.

EXAMPLE 4

Hamp-ol 9% Fe (4.97 grams), available commercially from Hampshire Chemicals, was dissolved in 10 ml of distilled water. To this mixture was added 5 grams of a 43% by weight solution of 1,3,5-tri(2-hydroxyethyl)hexahydro-s-triazine, available commercially from Quaker Chemical Corporation of Conshohocken Pa., 0.32 grams of a 50% by weight solution of sodium hydroxide, available commercially from Aldrich Chemical of Milwaukee Wis. and 100 grams of distilled water. The solution was then reacted with 99.5% hydrogen sulfide gas, available commercially from Aldrich Chemical of Milwaukee Wis. in a 500 ml bottle by bubbling the hydrogen sulfide into the solution at room temperature (approx 20 C.) at a flow rate of 9.3 ml/min. The bubbling was continued until the presence of hydrogen sulfide was detected in the gas exiting the bottle with a Sensidyn tube. Once the material was spent, the hydrogen sulfide bubbling tube was replaced with an ozone enriched air bubbling tube. The ozone enriched air was generated from air using a Coolant Manager ozone generator from Hyde Products Inc. The ozone concentration generated in the air by the Coolant Manager was 431 ppm The ozone enriched air was bubbled through the solution at room temperature (approx 20 C.) at a flow rate of 38 ml/sec for an average of 1 hour. The solid precipitate was vacuum filtered with a 5 micron glass filter. The process was repeated with the same solution for 3 full cycles. At the end of 3 cycles, 4.2 grams of hydrogen sulfide had been reacted. Total solid recovery was 3.0 grams.

EXAMPLE 5

Hamp-ol 9% Fe (0.5 grams), available commercially from Hampshire Chemicals, was dissolved in 10 ml of distilled water. To this mixture was added 5 grams of a 43% by weight solution of 1,3,5-tri(2-hydroxyethyl)hexahydro-s-triazine, available commercially from Quaker Chemical Corporation of Conshohocken Pa., 0.4 grams of sodium carbonate, available commercially from Aldrich Chemical of Milwaukee Wis. and 100 grams of distilled water. The solution was then reacted with 99.5% hydrogen sulfide gas, available commercially from Aldrich Chemical of Milwaukee Wis. in a 500 ml bottle by bubbling the hydrogen sulfide into the solution at room temperature (approx 20 C.) at a flow rate of 4.8 ml/min. The bubbling was continued until the presence of hydrogen sulfide was detected in the gas exiting the bottle with a Sensidyn tube. Once the material was spent, the hydrogen sulfide bubbling tube was replaced with an ozone enriched air bubbling tube. The ozone enriched air was generated from air using a Coolant Manager ozone generator from Hyde Products Inc. The ozone concentration generated in the air by the Coolant Manager was 431 ppm The ozone enriched air was bubbled through the solution at room temperature (approx 20 C.) at a flow rate of 38 ml/sec for an average of 1 hour. The solid precipitate was vacuum filtered with a 5 micron glass filter. The process was repeated with the same solution for 4 full cycles. At the end of 4 cycles, 3.9 grams of hydrogen sulfide had been reacted. Total solid recovery was 2.5 grams.

EXAMPLE 6

Hamp-ol 9% Fe (0.5 grams), available commercially from Hampshire Chemicals, was dissolved in 10 ml of distilled water. To this mixture was added 5.2 grams of a 43% solution of 1,3,5-tri(2-hydroxyethyl)hexahydro-s-triazine, available commercially from Quaker Chemical Corporation of Conshohocken Pa., 0.16 grams of a 50% by weight sodium hydroxide solution, available commercially from Aldrich Chemical of Milwaukee Wis. 0.008 grams of 1-dodecanol and 100 grams of distilled water. The solution was then reacted with 99.5% hydrogen sulfide gas, available commercially from Aldrich Chemical of Milwaukee Wis. in a 500 ml bottle by bubbling the hydrogen sulfide into the solution at room temperature (approx 20 C.) at a flow rate of 8.5 ml/min. The bubbling was continued until the presence of hydrogen sulfide was detected in the gas exiting the bottle with a Sensidyn tube. Once the material was spent, the hydrogen sulfide bubbling tube was replaced with an ozone enriched air bubbling tube. The ozone enriched air was generated from air using a Coolant Manager ozone generator from Hyde Products Inc. The ozone concentration generated in the air by the Coolant Manager was 431 ppm The ozone enriched air was bubbled through the solution at room temperature (approx 20 C.) at a flow rate of 38 ml/sec for an average of 1 hour. The solid precipitate was vacuum filtered with a 5 micron glass filter. The process was repeated with the same solution for 5 full cycles. At the end of 5 cycles, 5.0 grams of hydrogen sulfide had been reacted. Total solid recovery was 4.0 grams.

EXAMPLE 7

Two (2) gallons of a 43% solution of 1,3,5-(2-hydroxyethyl)hexahydro-s-triazine, available commercially from Quaker Chemical Corp. that had been previously reacted to completion in an off-gas scrubbing tower located at a municipal waste treatment plant was mixed with 1.0 pound of sodium hydroxide, 2.2 pounds of Hamp-ol 9%, available from Hampshire Chemicals, and 0.05 pounds of 1dodecanol, available from Aldrich Chemical. The resultant solution was reacted with air in a five gallon pail by inserting a Teflon tube fitted with a bubbling stone and applying air at a flow rate of 500 ml/sec for 27 hours. The resultant solution was filtered by vacuum filtration with a #1 Whatman filter paper available from Fisher Scientific and analyzed by $^{13}$C NMR. The solution was found to be completely regenerated.

EXAMPLE 8

Five grams of a 43% solution of 1,3,5-tri(2-hydroxyethyl)hexahydro-s-triazine, available commercially from Quaker Chemical Corporation of Conshohocken PA was mixed with 3.29 grams of a 50% sodium hydroxide solution, available from Aldrich Chemical of Milwaukee Wis. and 11.00 grams of sodium Vanadate, available from Aldrich Chemical where added to a 500 ml jar and diluted to 200 ml with water. Anthraquinone 2,6-disulfonic acid (19.9 grams) was added to the mixture. The mixture was then reacted successively with the hydrogen sulfide containing gas mixtures outlined in table 1:

TABLE 1

| Gas Composition | Total H$_2$S |
| --- | --- |
| 99.5% H$_2$S @ 5.2 ml/min with 100% CO$_2$ @ 5.2 ml/min Air at 1500 ml/min for 2.3 hours | 0.64 g |
| 99.5% H$_2$S @ 5.2 ml/min with 100% CO$_2$ @ 5.2 ml/min Air at 1500 ml/min for 2.3 hours | 0.46 g |
| 99.5% H$_2$S @ 10.4 ml/min Air at 1500 ml/min for 2.3 hours | 0.33 g |
| 99.5% H$_2$S @ 10.4 ml/min Air at 1500 ml/min for 2.3 hours | 0.99 g |
| 99.5% H$_2$S @ 10.4 m/min Air at 1500 ml/min for 2.3 hours | 0.62 g |
| 99.5% H$_2$S @ 5.2 ml/min with 100% CO$_2$ @ 5.2 ml/min Air at 1500 ml/min for 2.3 hours | 0.49 g |
| 99.5% H$_2$S @ 10.4 ml/min Air at 1500 ml/min for 2.3 hours | 1.15 g |
| 99.5% H$_2$S @ 5.2 ml/min with 100% CO$_2$ @ 5.2 ml/min Air at 1500 ml/min for 2.3 hours | 0.43 g |
| 99.5% H$_2$S @ 5.2 ml/min with 100% CO$_2$ @ 5.2 ml/min | 0.36 g |

TABLE 1-continued

| Gas Composition | Total H$_2$S |
| --- | --- |
| Air at 1500 ml/min for 2.3 hours | |
| 99.5% H$_2$S @ 5.2 ml/min with 100% CO$_2$ @ 5.2 ml/min | 1.00 g |
| Air at 1500 ml/min for 2.3 hours | |
| 99.5% H$_2$S @ 5.2 ml/min with 100% CO$_2$ @ 5.2 ml/min | 0.43 g |
| Air at 1500 ml/min for 2.3 hours | |
| 99.5% H$_2$S @ 5.2 ml/min with 100% CO$_2$ @ 5.2 ml/min | 0.23 g |
| Air at 1500 ml/min for 2.3 hours | |
| 99.5% H$_2$S @ 5.2 ml/min with 100% CO$_2$ @ 5.2 ml/min | |

Elemental sulfur was removed from the reaction mixture at the completion of each air oxidation cycle by vacuum filtration with a #1 Whatman filter paper available from Fisher Scientific.

EXAMPLE 9

Five grams of 64% by weight aqueous solution of 1,3,5-trimethyl-hexahydro-s-triazine was added to a four ounce jar. The solution was reacted with 3.4 grams of 99.5% hydrogen sulfide gas available from Aldrich Chemicals by bubbling the hydrogen sulfide into the solution at room temperature (approx 20 C.) at a flow rate of 10.4 ml/min. The bubbling was continued until the presence of hydrogen sulfide was detected in the gas exiting the bottle with a Sensidyn tube. Once bubbling was completed, 0.46 grams of ferric chloride available from Aldrich Chemicals, 1.0 grams of Na$_3$HEDTA, available from Aldrich Chemicals, 0.8 grams of a 50% by weight aqueous solution of sodium hydroxide available from Aldrich Chemical of Milwaukee Wis. and 150 ml of water where combined with the solution. The hydrogen sulfide bubbling tube was replaced with an ozone enriched air bubbling tube. The ozone enriched air was generated from air using a Coolant Manager ozone generator from Hyde Products Inc. The ozone concentration generated in the air by the Coolant Manager was 431 ppm. The ozone enriched air was bubbled through the solution at room temperature (approx 20 C.) for three hours. The resultant slurry was vacuum filtered with a Watman #1 filter from Fisher Scientific. NMR analysis of the resultant aqueous phase showed that the starting triazine had been regenerated.

EXAMPLE 10

A solution was prepared with 100 ml of distilled water, 50 grams of a 43% by weight aqueous solution of 1,3,5-tri[2-hydroxyethyl]hexahydro-s-triazine, available commercially from Quaker Chemical Corporation of Conshohocken Pa., 50 grams of Hamp-ol 9%, available from Hampshire Chemicals, 3.2 grams of a 50% by weight aqueous solution of sodium hydroxide, available from Aldrich Chemical of Milwaukee Wis. and 1 gram of 1-dodecanol, available from Aldrich Chemical of Milwaukee Wis. The solution was divided equally between two four ounce glass jam. The jars where fitted with tubing from each of the pump heads of a two head peristalic pump to allow for pumping the contents from each jar to the other on a continuous basis at a substantially similar rate of 1 ml/min. The first jar was equipped with a bubble tubing attached to a gas lecture bottle containing 99.5% hydrogen sulfide, available from Aldrich Chemical of Milwaukee Wis. The second jar was equipped with a bubble tubing attached to the outlet of a Coolant Manager ozone generator from Hyde Products Inc. The Coolant Manager supplied ozone enriched air with an ozone concentration of 431 ppm. Hydrogen sulfide was supplied to the first jar at a flow rate of 8.5 ml/min while ozone enriched air was supplied to the second jar at a flow rate of 38 ml/sec. The system was run until a total of 20.4 grams of hydrogen sulfide had been reacted, indicating continuous regeneration of the reaction solution. Continuous regeneration was also self evident by the black color of the solution in the jar in which hydrogen sulfide was introduced, and the orange color of the solution in the jar in which the ozone enriched air was introduced.

The present invention may be embodied in other specific forms without departing from the spirit or essential attributes thereof and, accordingly, reference should be made to the appended claims rather than to the foregoing specification as indicated scope of the invention.

We claim:
1. A method for the removal of sulfides from gaseous streams comprising
   (a) contacting the sulfide containing gas stream in a contacting zone with an aqueous scavenging mixture, said scavenging mixture comprising an aminal scavenging compound, an inorganic base and a polyvalent metal oxidation catalyst for a period of time to at least partially reduce the level of hydrogen sulfide in the gas stream,
   (b) regenerating at least a portion of said aminal scavenging compound with a gas selected from the group consisting of air, oxygen enriched air, oxygen, ozone enriched air and ozone in a regeneration zone, and
   (c) returning at least a portion of the aqueous scavenging mixture to the contacting zone.

2. A method as in claim 1 wherein said aminal scavenging compound is a reaction product between
   (a) an aldehyde and
   (b) an nitrogen compound.

3. A method as in claim 2 wherein said aminal scavenging compound is a reaction product between
   (a) an aldehyde selected from the group consisting of hydrous and anhydrous forms of formula (II):

Where R is selected from the group consisting of: (i) hydrogen; (ii) a substituted or unsubstituted, saturated or unsaturated, linear, branched or cyclic hydrocarbon chain of 1 to 50 carbons; (iii) a substituted or unsubstituted, saturated or unsaturated, linear, branched or cyclic hydrocarbon chain of 1 to 50 carbons comprising at least one heteroatom selected from the group consisting of nitrogen, oxygen, sulfur and halogen; (iv) a substituted or unsubstituted polymeric chain; (v) a substituted or unsubstituted dimer (vi) a mono or polyaldehyde, and
   (b) an nitrogen compound of formula (III)

Wherein R$^1$ and R$^2$ are independently selected from the group consisting of: (i) hydrogen; (ii) a substituted or unsubstituted, saturated or unsaturated, linear, branched or cyclic hydrocarbon chain of 1 to 50 carbons; (iii) a substituted or unsubstituted, saturated or unsaturated, linear, branched or cyclic hydrocarbon chain of 1 to 50 carbons comprising at least one heteroatom selected from the group consisting of nitrogen, oxygen, sulfur and halogen; (iv) a substituted or unsubstituted polymeric chain; and (v) a direct bond to any other of $R^1$ and $R^2$;

wherein $R^1$ and $R^2$ may be individually bonded to one another.

4. A method as in claim 3 wherein said aldehyde is selected from the group consisting of formaldehyde, paraformaldehyde, glyoxal, acetaldehyde, butyraldehyde, benzaldehyde, N-(2-hydroxyethyl)dioxazine and oleylaldehyde.

5. A method as in claim 4 wherein said nitrogen compound is selected from the group consisting of methylamine, ethylamine, propylamine, isopropyl amine, oleylamine, ethylene diamine, diethylene triamine, dimethylamine, diethylamine, monoethanolamine, diethanolamine, morpholine, piperazine, thiomonoethanolamine and chlorooleylamine.

6. A method as in claim 3 wherein said nitrogen compound is selected from the group consisting of methylamine, ethylamine, propylamine, isopropyl amine, oleylamine, ethylene diamine, diethylene triamine, dimethylamine, diethylamine, monoethanolamine, diethanolamine, morpholine piperazine, thiomonoethanolamine and chlorooleylamine.

7. A method as in claim 3 wherein said reaction product comprises at least one of the compounds selected from the group consisting of compounds of formula I, IV and formula V:

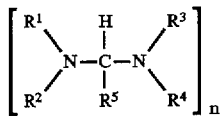

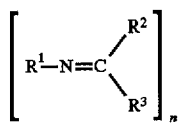

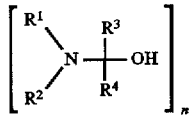

where n is an integer from 1 to 1000 and each of $R^1$, $R^2$, $R^3$, $R^4$, and $R^5$ is independently selected from the group consisting of (i) hydrogen; (ii) a substituted or unsubstituted, saturated or unsaturated, linear, branched or cyclic hydrocarbon chain of 1 to 20 carbons, (iii) a substituted or unsubstituted, saturated or unsaturated, linear, branched or cyclic hydrocarbon chain of 1 to 20 carbons comprising at least one heteroatom selected from the group consisting of nitrogen, oxygen, sulfur and halogen; (v) a substituted or unsubstituted polymeric chain; and (v) a direct bond to any other of $R^1$, $R^2$, $R^3$, $R^4$, and $R^5$;

wherein $R^1$, $R^2$, $R^3$, $R^4$, and $R^5$ may be individually bonded to one another.

8. A method as in claim 3 wherein said inorganic base is selected from the group consisting of group I and group II ions.

9. A method as in claim 8, where said inorganic base is selected from the group consisting of sodium and potassium.

10. A method as in claim 7 wherein said scavenging compound is a polycyclic polyaza compound.

11. A method as in claim 10 wherein said polycyclic polyaza compound is a hexahydro triazine.

12. A method as in claim 7 wherein said scavenging compound is an imine.

13. A method as in claim 1 wherein said polyvalent metal oxidation catalyst is selected from the group consisting of iron, copper, vanadium, manganese, platinum, tungsten, nickel, mercury, tin and lead.

14. A method as in claim 13 wherein said polyvalent metal oxidation catalyst is selected from the group consisting of iron and vanadium.

15. A method as in claim 1 wherein said scavenging mixture comprises a molar ratio of x:y:z where x is molar equivalents of said scavenging compound, y is molar equivalents of said inorganic base, and z is molar equivalents of said polyvalent metal oxidation catalyst, all present in diluent water present at up to 99.5 percent by weight of the total mixture, and wherein x, y, and z are each independently chosen numbers between 1 and 10,000.

16. A method as in claim 15 wherein y and z are each independently chosen numbers between 1 and 100.

17. A method as in claim 16 wherein y and z are each independently chosen numbers between 1 and 10.

18. A method as in claim 15 wherein said scavenging mixture comprises water in a quantity of 25 percent by weight to 99.5 percent by weight of the total composition.

19. A method as in claim 15 wherein said scavenging mixture comprises water in a quantity of 50 percent by weight to 99.5 percent by weight of the total composition.

20. A method for the removal of sulfides from gaseous streams comprising (a) contacting the sulfide containing gas stream with a scavenging mixture, said scavenging mixture comprising at least one of the compounds selected from the group consisting of compounds of formula I, IV and formula V:

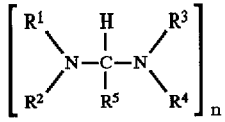

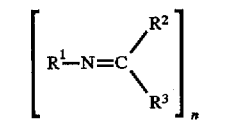

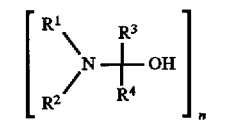

where n is an integer from 1 to 1000 and each of $R^1$, $R^2$, $R^3$, $R^4$, and $R^5$ is independently selected from the group consisting of (i) hydrogen; (ii) a substituted or unsubstituted, saturated or unsaturated, linear, branched or cyclic hydrocarbon chain of 1 to 20 carbons, (iii) a substituted or unsubstituted, saturated or unsaturated, linear, branched or cyclic hydrocarbon chain of 1 to 20 carbons comprising at least one heteroatom selected from the group consisting of nitrogen, oxygen, sulfur and halogen; (v) a substituted or unsubstituted polymeric chain; and (v) a direct bond to any other of $R^1$, $R^2$, $R^3$, $R^4$, and $R^5$;

wherein $R^1$, $R^2$, $R^3$, $R^4$, and $R^5$ may be individually bonded to one another;

an inorganic base selected from a group consisting of group I and group II ions; and a polyvalent metal oxidation catalyst selected from the group consisting of iron, copper, vanadium, manganese, platinum, tungsten, nickel, mercury, tin and lead;

(b) regenerating at least a portion of the scavenging compound with a gas selected from the group consisting of air, oxygen enriched air, oxygen, ozone enriched air and ozone in a regeneration zone, and (c) returning at least a portion of the aqueous scavenging mixture to the contacting zone.

* * * * *

UNITED STATES PATENT AND TRADE MARK OFFICE
CERTIFICATE OF CORRECTION

PATENT NO. : 5,698,171
DATED : December 16, 1997
INVENTOR(S) : Edward A. Trauffer and Muge Caglar It is certified that error appears in the above-identified patent and that said Letters Patent is hereby corrected as shown below:

Title page, item [57],
In the abstract, at line 1, before "streams.", insert --A method and composition for the removal of sulfides from gaseous--.

Signed and Sealed this

Tenth Day of March, 1998

Attest:

BRUCE LEHMAN

*Attesting Officer*         *Commissioner of Patents and Trademarks*